Dec. 15, 1964  C. C. ROE  3,161,083
PLURAL MOTOR VARIABLE SPEED GEAR DRIVE
Filed Jan. 14, 1960  6 Sheets-Sheet 1

INVENTOR:
CHARLES C. ROE
BY John F. Schmidt

Dec. 15, 1964  C. C. ROE  3,161,083
PLURAL MOTOR VARIABLE SPEED GEAR DRIVE
Filed Jan. 14, 1960  6 Sheets-Sheet 2

INVENTOR:
CHARLES C. ROE
BY John F. Schmidt

Dec. 15, 1964 C. C. ROE 3,161,083
PLURAL MOTOR VARIABLE SPEED GEAR DRIVE
Filed Jan. 14, 1960 6 Sheets-Sheet 3

INVENTOR:
CHARLES C. ROE
BY John F. Schmidt

Dec. 15, 1964

C. C. ROE 3,161,083

PLURAL MOTOR VARIABLE SPEED GEAR DRIVE

Filed Jan. 14, 1960

INVENTOR:
CHARLES C. ROE
BY John F. Schmidt

Dec. 15, 1964  C. C. ROE  3,161,083
PLURAL MOTOR VARIABLE SPEED GEAR DRIVE
Filed Jan. 14, 1960  6 Sheets-Sheet 5

INVENTOR:
CHARLES C. ROE
BY John F. Schmidt

Dec. 15, 1964   C. C. ROE   3,161,083
PLURAL MOTOR VARIABLE SPEED GEAR DRIVE
Filed Jan. 14, 1960   6 Sheets-Sheet 6

INVENTOR:
CHARLES C. ROE
BY John F. Schmidt

United States Patent Office 3,161,083
Patented Dec. 15, 1964

3,161,083
PLURAL MOTOR VARIABLE SPEED GEAR DRIVE
Charles C. Roe, East Peoria, Ill., assignor to LeTourneau-Westinghouse Company, Peoria, Ill., a corporation of Illinois
Filed Jan. 14, 1960, Ser. No. 2,473
7 Claims. (Cl. 74—675)

Electric drive systems for use with vehicles or to drive other loads at varying speeds and load resistance have heretofore generally been of the D.-C. type, the variable torque A.-C. motor type using motors with drooping speed-torque characteristics, or of the variable frequency A.-C. type. These systems have not proven generally practical because of the size and weight involved, maintenance problems, difficulties of attaining satisfactory control, low efficiency, and the like. In general, these systems have been based on the concept that successful electric drive operation demands an electrical system capable of establishing an overall sharply descending load-speed characteristic, coupled with some way to vary the value of this characteristic up and down to accomplish the necessary speed variations under given load conditions.

In the apparatus of the present invention the motor drive connecting the generator to the load is of the substantially constant torque type on a steady state basis. Speed selection is provided by cooperating motor mechanisms that have at least two output speds for any one generator speed. Suitable switch elements are provided to shift or reconnect the motor means from one output speed condition to another. During the switching operation, however, advantage is taken of the electrical system characteristics (including an excitation system providing a constant volts-per-cycle steady state output under all loads) to provide instantaneous decoupling and gradual but prompt recoupling of the load to the generator, thereby enabling the operator to shift in any direction from one steady state speed to another without at any time imparting a shock to the electrical or mechanical system and in a manner by which the action of the electrical system itself serves as a medium for accomplishing a smooth but rapid transition from one driving relationship to another.

More particularly, and as applied to an A.-C. road machine drive system, the system of the present invention utilizes a diesel engine driven A.-C. generator with a field winding fed by a rectifier type self-excitation system of the type generally described hereafter. A contactor is provided in the circuit from the excitation system to the alternator field and is shunted by a capacitor. In shifting from one drive speed to another, this contactor is opened and the field flux quickly falls to practically zero. The rectifier excitation system and the capacitor coact to provide a very rapid decay of the field flux. When the new drive connection is established, field current is again applied and the system gradually engages as the field current and flux build up under the combined influence of the available battery voltage, the rectifier boost voltage derived from alternator armature current flow, and the rectifier boost voltage derived from alternator output voltage. The motor drive consists of a plurality of two-speed squirrel cage induction motors which may be selectively energized to provide a selection of a number of forward and reverse drive speeds. Electrical contactors are provided to establish the requisite drive connections for each speed as desired and for each side of the vehicle separately.

In this drive mechanism suitable speed control levers are movable to any one of predetermined positions to select the electrical contactor conditions for the various forward and reverse speeds. As any of these levers is changed from one position (and hence one speed selection) to another, the field contactor is opened coincidentally with the opening of the existing motor drive connection, thereby connecting the capacitors across the field (and the contactor contacts) and bringing the field flux quickly to a low or zero value. Field current oscillations are prevented by the rectifier that serves to boost the field current. As the speed selection lever is then moved to the new operating position, the motor is reconnected for the new speed and the field current contactor is simultaneously reclosed. Field current and flux now build up at a smooth but relatively rapid rate to cause the generator and motor to pick up load and gradually to reach the new operating speed relationship.

It has been found that in this fashion advantage can be taken of the high operating efficiencies and relatively small sizes of constant torque A.-C. induction motors. At the same time, the time delay mechanism and momentary field current interruption serve to provide a smooth but rapid translation between successive operating conditions.

For speed variations less than those requiring motor reconnection, the prime mover speed is varied as desired. Preferably, in the case of an internal combustion engine prime mover, a governor is provided to cause the engine to seek (and generally to maintain) a selected speed and the operator merely controls the speed which the engine seeks. It has been found that in a practical tractor drive, highly effective operation may be obtained by this mechanism without bucking, grabbing, stalling, or other undesirable effects while still providing a wide range of operating speeds and highly efficient motor and generator operation.

A particular feature of the present invention resides in the use—in conjunction with other elements herein described—of a field current supply system giving a constant steady state alternator volts-per-cycle value under all load conditions. An alternator field current supply system of this type is shown and described in Chandler et al. Patent 2,844,783, entitled Field Current Supply System for an Alternator, assigned to the same assignee as the present invention. A characteristic and presently important feature of this field current supply system is that it includes elements responsive to both armature voltage and armature current to energize the field current supply rectifier. In the normal operation of the speed control system of the present invention the armature voltage may be very small (or even zero) at the instant the motors are reconnected, as for example, when the load has come to a halt and the motors must accelerate from the rest position. On the other hand normal system operation may result in substantial armature voltage but little or no armature current at the instant of motor reconnection, as for example when the load is moving and shift is made to a slower speed reconnection. The field current supply system herein utilized responds to armature voltage or armature current, or both, and assures a prompt and effective reengagement of the drive mechanism under these widely varying operating conditions, as well as the intermediate conditions more frequently encountered.

The present invention further resides in an improved multispeed motor drive arrangement using in-line cooperating motors and a planetary gear system.

It is therefore a general object of the present invention to provide an improved A.-C. electric drive system in which variable speed is provided through field current and flux interruption followed by a smooth but rapid field current and flux buildup under the influence of field voltage supply elements responsive both to armature current and armature voltage.

It is another object of the present invention to provide a system of the foregoing type utilizing motors having substantially constant torque characteristics in cooperative relation with prime mover speed control and momentary circuit connections to provide smooth dynamic translation from one operating condition to another.

Another object of the present invention is to provide an improved variable speed electric drive system having a speed selection lever movable between a plurality of speed selection points and serving—upon such motion— to interrupt any preexisting drive connection and thereafter gradually establish a new driving relationship.

Still another object of the present invention is to provide an improved electric drive system especially suitable for hoists, vehicles, and like leads in which an engine driven generator and a drive motor system are selectively connectable to provide more than one drive relationship, and reconnecting means is provided including elements momentarily operable to interrupt the generator field current circuit and bring the field flux to a very low value while the reconnection takes place and thereafter causing the field flux to restore under rapid but smooth generator field current buildup and thereby achieve a smooth, prompt re-engagement of the drive relationship.

Another objective of the present invention is to provide an improved electric drive system of the foregoing type in which a high efficiency A.-C. generator and a plurality of high efficiency low resistance squirrel cage motors are selectively connectable to provide any one of the plurality of drive ratios, engine control means provides an adjustment of the prime mover and hence the drive speed under any drive ratio and load condition, and the electrical system is so constructed and arranged that the generator and motors are effectively and very rapidly disconnected prior to circuit changes and, after the circuit changes, are rapidly but smoothly reconnected to effect a smooth transition to the new driving relationship.

Still another object of the present invention is to provide an improved electric drive system in which an A.-C. generator receives field current at least in part from a rectifier and in which capacitor elements coact with the rectifier to provide a very rapid reduction in field flux to disconnect the electrical elements to disengage the generator from the motor for reconnecting purposes.

Still another object is to provide an improved motor unit having a plurality of selectable operating speed values and utilizing a pair of coaxial motors with their shafts in telescopic relation to drive a planetary gear mechanism.

Other objects of the present invention are to provide an improved variable speed electric drive mechanism that is readily accommodated to an efficient and practical generator field current supply system, involves a minimum of parts, permits the use of high efficiency induction motors, is compatible with the use of standard generators, control elements, and other parts, and yet provides a variety of speed values and is capable of shifting smoothly but promptly from one value to another without impact, chatter, jerking, or hunting, and in other respects forms a practical system highly useful for road making machinery, vehicles generally, hoists, and other variable speed load apparatus.

The novel features which I believe to be characteristic of my invention are set forth with particularity in the appended claims. My invention itself, together with further objects and advantages thereof, will best be understood by reference to the following description taken in connection with the accompanying drawings, in which:

Figure 1:
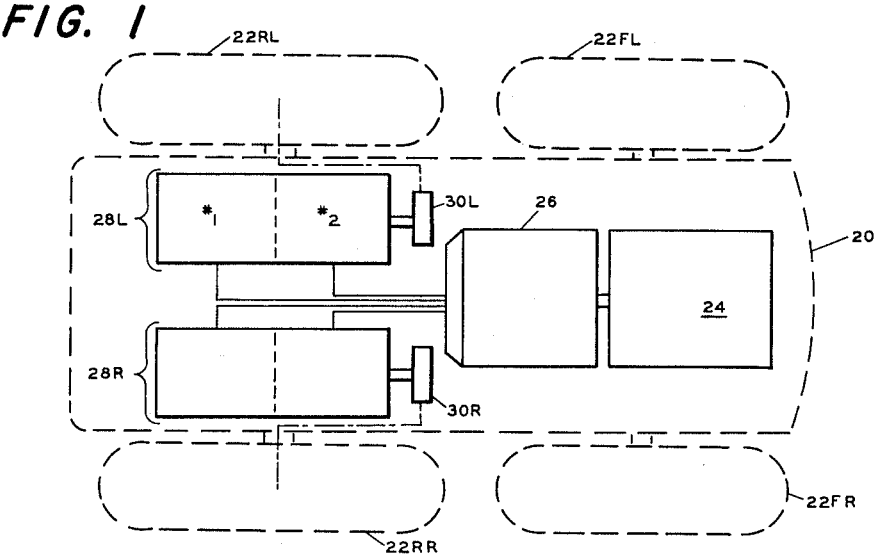
FIG. 1 is a diagrammatic top plan view of a complete tractor using the drive mechanism of the present invention.
Figure 5:
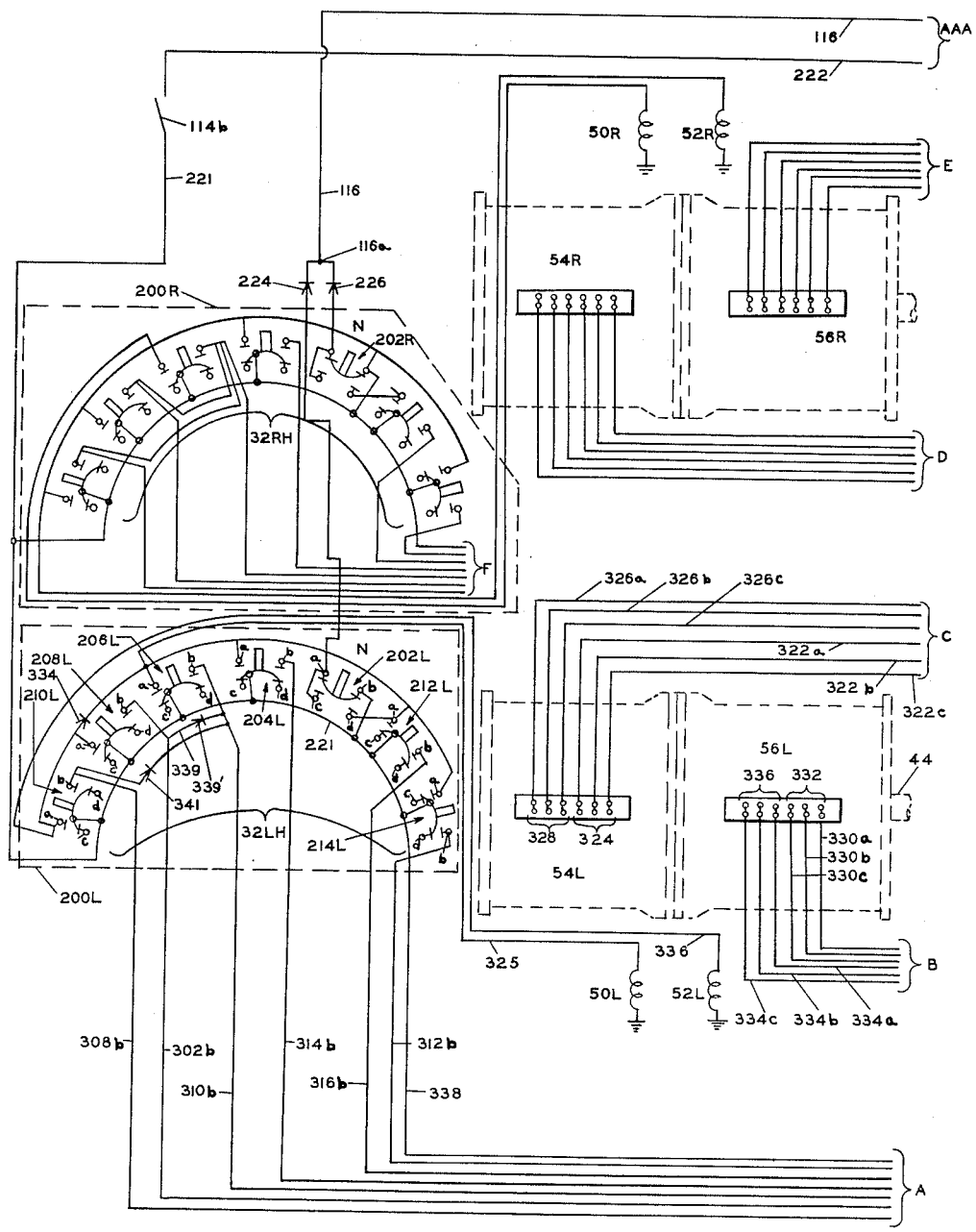
Figure 6:
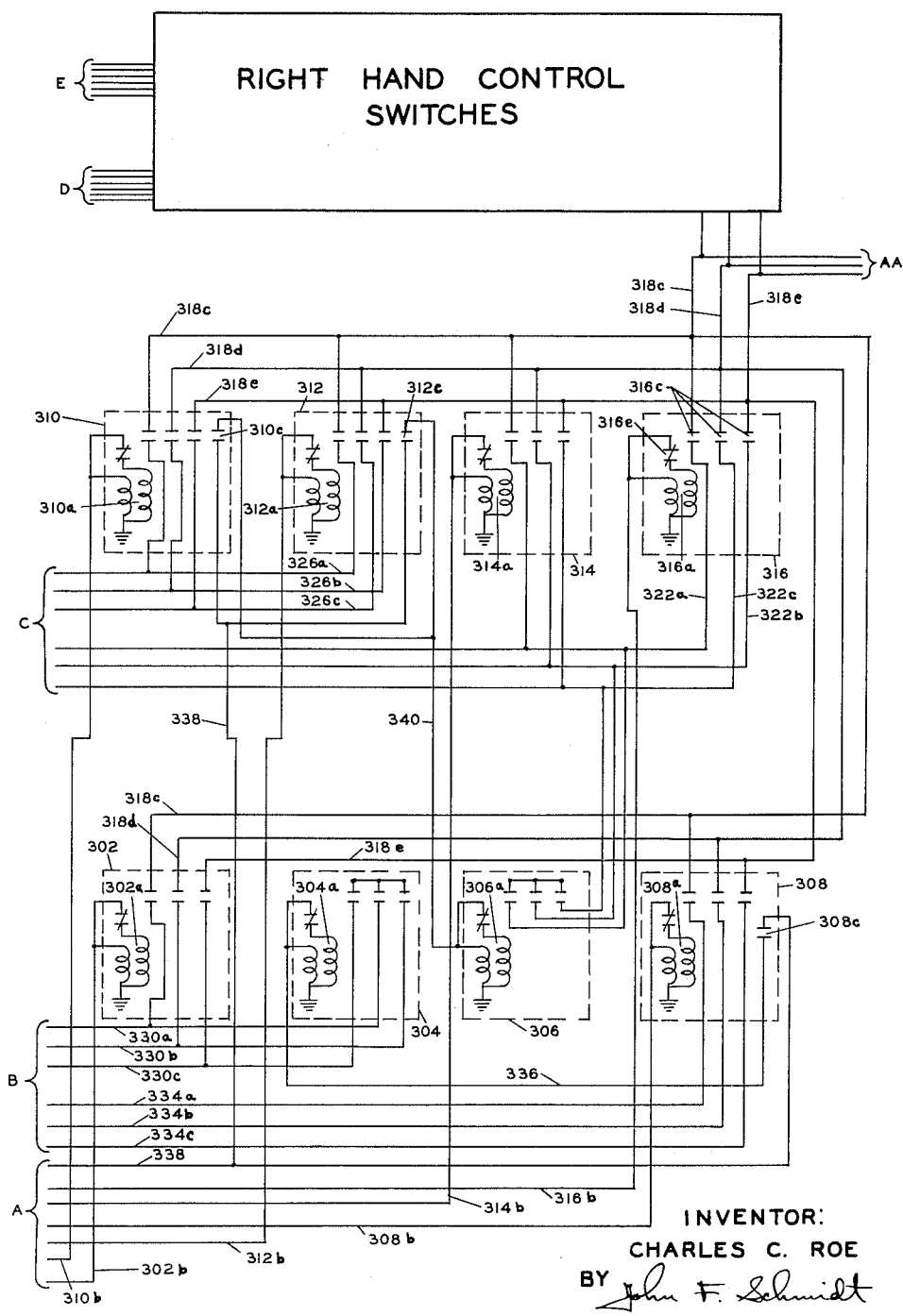
Figure 7:
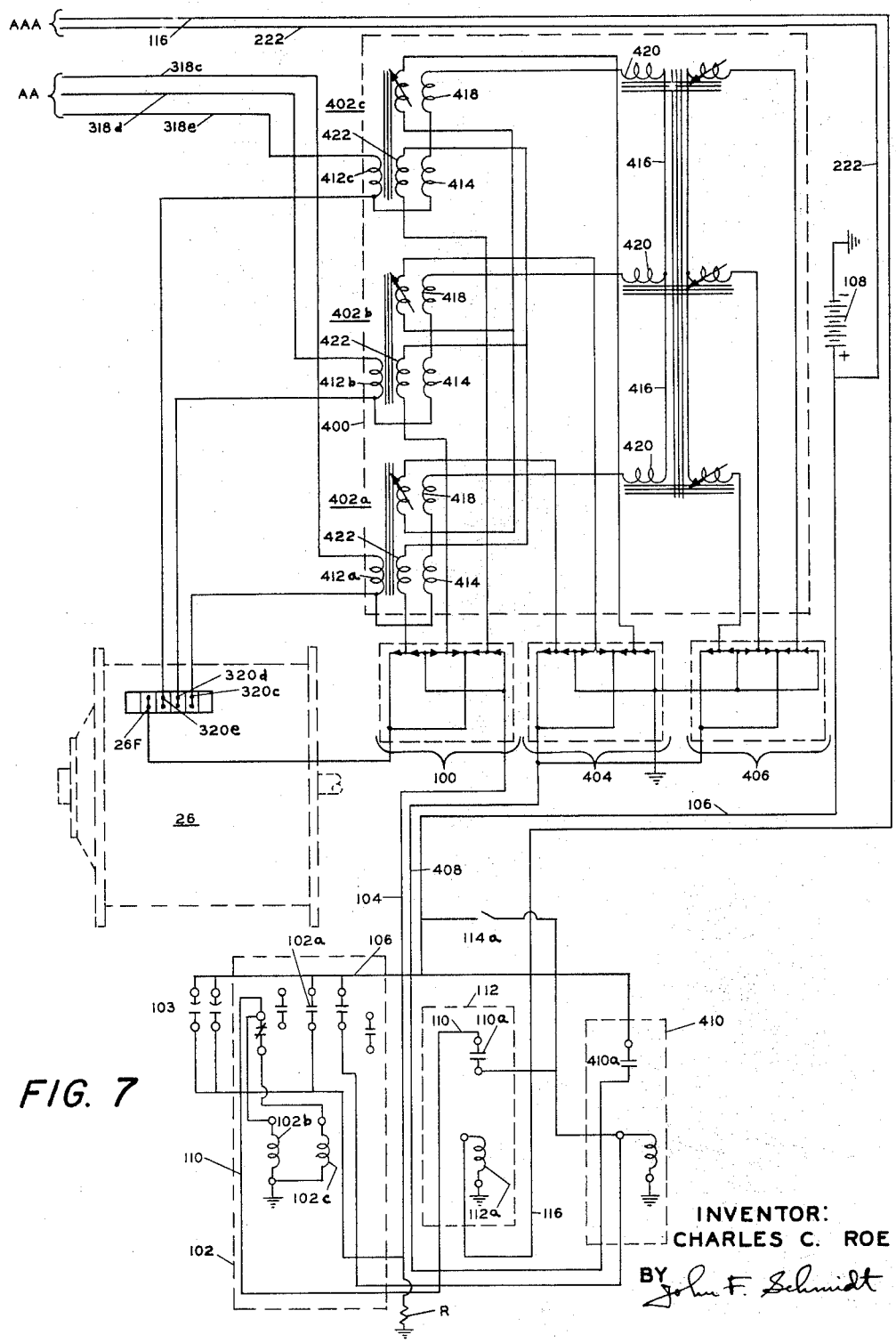
Figure 8:
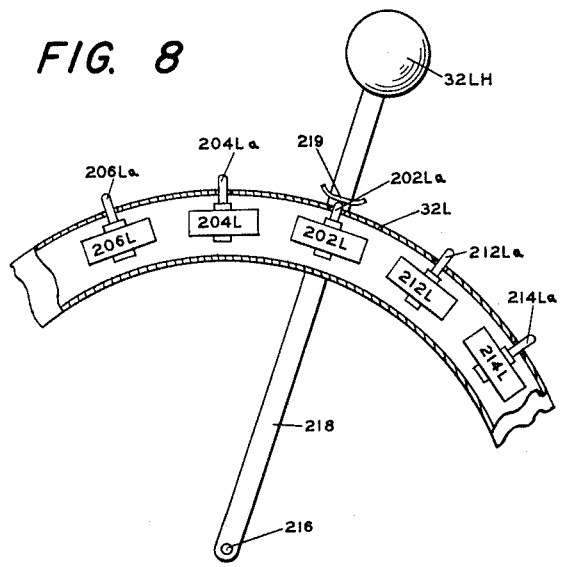
Figure 9:
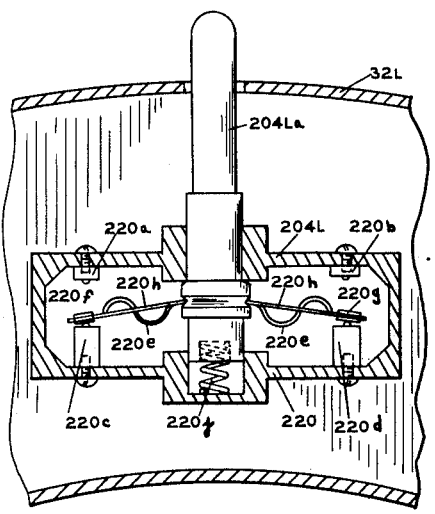
Figure 10:
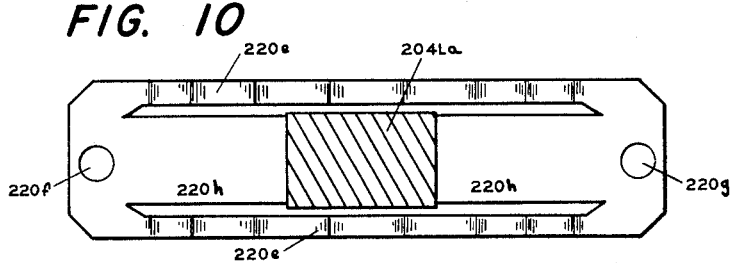
Figure 11:
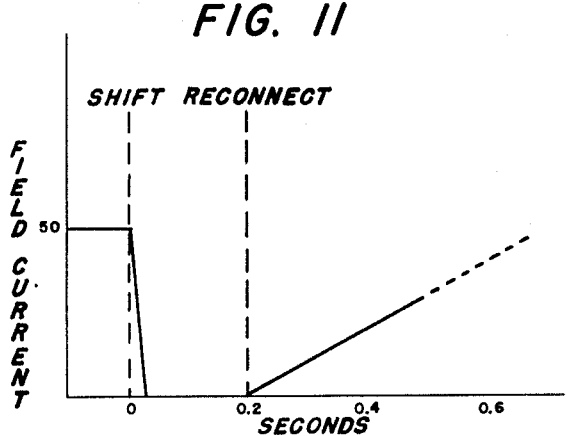

FIGS. 5, 6, and 7 are the electrical circuit diagrams of the drive mechanism of the tractor of FIG. 1, with parts shown in block form for clarity;

FIG. 8 is a somewhat diagrammatic enlarged side elevational view of one of the control mechanisms of the tractor of FIG. 1;

FIG. 9 is an enlarged view showing the construction and mounting of one of the switches used in the control mechanism of FIG. 8;

FIG. 10 is a top plan view with parts in cross-section of a movable contact element of the switch of FIG. 9; and FIG. 11 is a diagram illustrating the sequence of events upon change of the drive relationship.

The Overall System

The overall mechanical structure as applied to a 4-wheel type tractor is shown in general diagrammatic form in FIG. 1. As shown, the tractor consists of a chassis 20 carried by the front wheels 22FL and 22FR and the rear wheels 22RL and 22RR. Each wheel is mounted for rotation about an axis transverse to the longitudinal axis of the chassis. Steering is effected by selectively driving or braking the rear wheels 22RL and 22RR as hereinafter described in detail.

Drive power is derived from an engine 24 carried by chassis 20. This engine is preferably a diesel engine, but can be of other type if desired. This engine is attached to the A.-C. generator 26 to drive the same. While mechanical decoupling devices—or even speed change gears—may be provided between the engine 24 and the generator 26, the electrical arrangement of the present system serves to provide such effective decoupling and such a wide variety of drive relationships that these are rarely, if ever, desirable.

A right hand motor unit 28R is electrically connected to the generator 26 through switch mechanism hereinafter described in detail. This motor unit is connected to the right rear wheel 22RR by planetary gear mechanism 30R, also hereinafter described in detail. This motor unit includes a pair of coaxial two-speed induction motors which—through the action of appropriate brake mechanism, circuit connectors, and planetary gear drive unit 30R—provides a selection of many forward and reverse speed relationships between the generator (and prime mover) speed of rotation and the speed of the wheel 22RR.

In like fashion, the left hand motor unit 28L is electrically connected to the generator 26 (through the switching and control mechanism hereinafter described). This motor unit likewise consists of a pair of two-speed coaxial induction motors that drive a planetary gear mechanism 30L to provide a selection of many forward and reverse synchronous speed relationships at the rear left wheel 22RL.

Figure 2:
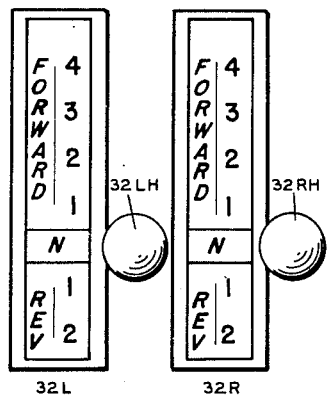
FIG. 2 is a view in elevation and in diagrammatic form of the controls of the tractor of FIG. 1.

The steering and speed control mechanism is shown generally in physical form in FIG. 2. Control is provided by the two quadrant units 32R and 32L. The quadrant units each have a control handle 32RH and 32LH, respectively, which is manually moved between the respective control positions to provide the desired forward and reverse speeds and hence the desired rates of forward and reverse speed and turn.

The static and dynamic circuit connections effected by movements of the control handles 32RH and 32LH are set forth in detail hereafter. The control handles 32RH and 32LH (and the respective quadrant units 32R and 32L) serve to provide selective first to fourth forward speeds and first and second reverse speeds for the right and left wheels, respectively. These may be adjusted as desired for straight or turning forward and reverse travel.

The Drive Motor Constructions

The drive motor units 28L and 28R and the gear connections 30L and 30R by which they are connected to the respective wheels 22RL and 22RR, respectively, are of essentially identical construction for both the right hand and left hand units. The following description is accordingly confined to the drive unit 28L and the associated gear drive 30L, it being understood that the units 28R and 30R differ only in that they are located on the right side rather than the left side of the machine and in the incident necessary mechanical differences.

Figure 3:
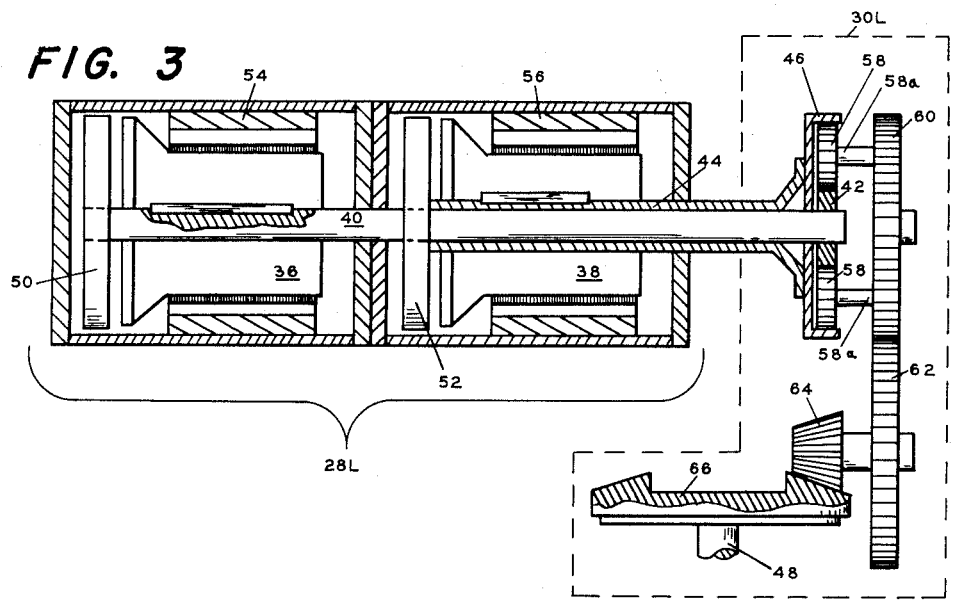
FIG. 3 is a diagrammatic view in partial cross-section of one of the drive motor mechanisms of the tractor of FIG. 1.
Figure 4:
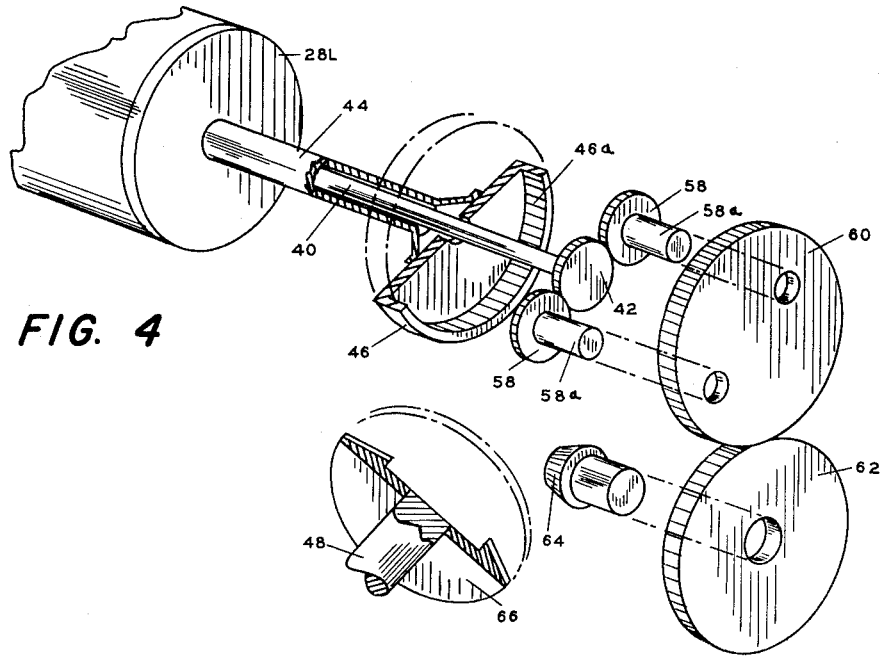
FIG. 4 is an exploded view in perspective of the drive gears used with the motor mechanisms of the tractor of FIG. 1.

As shown best in FIG. 3, the unit 28L has two squirrel cage induction motor rotors 36 and 38. The former rotor is mounted on the central shaft 40 which extends through the length of the motor unit 28L and protrudes outboard the right hand end as seen in the diagrammatic view of FIG. 3 to receive the spur pinion gear 42. The rotor 38 is mounted on the hollow shaft 44 which telescopes over the shaft 40 and protrudes outboard the right hand end of the motor unit 28L to a point essentially coterminous with shaft 40. Shaft 44 receives the ring gear 46 which defines internal spur gear teeth 46a (FIG. 4) aligned with, coaxial to, and complementary to the teeth of the spur sun gear 42. Thus, the sun gear 42 is driven by the rotor 36 and the ring gear 46 is driven by the rotor 38. These two gears ultimately drive the power output shaft 48 which drives the rear left wheel 22RL through suitable shafts and gears (not shown).

The shaft 40 is connected to a brake 50, which is shown diagrammatically in FIG. 3. Similarly, the shaft 44 is connected to the brake 52. These brakes are selectively engaged upon energization of suitable solenoids (not shown in FIG. 3, but indicated electrically at 50L and 52L in FIG. 5) to resist rotation of the corresponding shaft and thereby control the planetary gear drive and vehicle operation as hereinafter described in detail.

The squirrel cage rotors 36 and 38 are driven by the stators 54L and 56L, respectively. These stators are of silicon steel laminations with peripheral slots to receive polyphase induction motor windings. The windings (not shown in FIG. 3) are of the two-speed type well known to the art. That is, each stator 54L and 56L has in effect two polyphase induction motor windings. One of these is designed to produce a field having, say, six poles, and hence a rotation at 2400 r.p.m. when energized at 120 cycles. The other is designed to produce a field having, say, twelve poles, and hence a field rotating at 1200 r.p.m. when energized at 120 cycles. Thus, by selectively energizing the windings of the rotors 54L and 56L, they may be caused to produce 1200 r.p.m. or 2400 r.p.m. synchronous speed rotations of the respective rotors, or correspondingly higher or lower values at prime mover speeds giving other than 120 cycle excitation.

The switching and other control mechanism by which the stators 54L and 56L are selectively energized as required to produce the desired vehicle speeds are described in detail hereafter with respect to the electrical control mechanism.

The gears 42 and 46 receive a pair of planet gears 58, having teeth in dual meshing engagement with the teeth of both gears 42 and 46. These planet gears are mounted for free rotation on the respective shafts 58a which are carried in diametrically opposed positions on the planetary carrier 60, preferably supplemented by a suitable planet cage (not shown). The gear 60 has spur teeth in engagement with the like spur gear teeth of gear 62 to deliver power through the bevel gears 64 and 66 to the output shaft 48.

It will be noted that the planet carrier output gear 60 rotates about its axis in accordance with the revolutions of the planet gear 58 about the same axis, and that the position of the outer edge of each planet gear 58 is fixed by the gear 46 (and hence the position of shaft 44) and the position of the inner edge of each planet gear is fixed by the sun gear 42 (and hence the shaft 40). In a practical construction, the planet gears 58 may have 15 teeth, the sun gear 42 may have 30 teeth, and the gear 46 may have 60 teeth.

It can be shown that with the above gear ratios (or a multiple or fraction of the tooth numbers), the speed of rotation of the output gear 60 about its axis is equal to two thirds of the speed of the shaft 44 plus one third of the speed of the shaft 40. Hence, with the brake 52 engaged and the shaft 40 driven alone, the gear system acts as a three to one speed step-down gear system. If the stator 54L is connected as a twelve pole stator and the prime mover 24 driven to give, say, 100 cycles and hence 1000 r.p.m. synchronous speed, for example, the output gear 60 will then be driven at somewhat less than 333 r.p.m. This is the lowest output speed.

To obtain the highest output speed value, the stators 54L and 56L are both connected for highest speed rotation and the prime mover 24 is operated at high speed. With six pole stator windings connected for each stator 54L and 56L, and the prime mover rotating to give, say, 200 cycles, the output gear 60 will be driven at somewhat less than 4000 r.p.m., or about twelve times the lowest speed. Between these extreme conditions a great variety of possible output synchronous speeds may be obtained by choice of energization of brake 50 and 52, the energization and connection of the stators 54L and 56L, and the prime mover speed. Selections as between some of these various possible speed combinations are provided by the control apparatus hereinafter described in detail.

The planetary gear arrangement coacts with the two drive motors defined by the stators 54L and 56L, respectively, to provide effective vehicle control at high speed. As described above in connection with Fig. 2, the right and left hand drive motors each have four forward and two reverse speeds controlled by the handles 32LH and 32RH. As hereinafter described, the two reverse and two lowest forward speeds are obtained by controlling only the stator 54L (and the corresponding stator or armature of the motor on the opposite wheel), and hence the rotor 36 and shaft 40. The high forward speeds are obtained through additional control of the action of the stator 56 (and the corresponding stator of the other drive motor). If at any time an operator places the handle 32LH in any operating position, it merely connects the stators 54L and 56L in the corresponding operating positions.

In the normal natural use of the control mechanism provided by the levers 32LH and 32RH, these levers or control handles are used by the operator to set the direction of vehicle travel as well as the forward or reverse speed. Under any conditions of initial movement or turn, the operator instinctively controls the machine in a way that accommodates the rate of turn to the actual vehicle movement, terrain, etc., and does not tend to erroneously set the controls in a way giving rise to undue tipping effect.

*The Electrical System*

The electrical system is shown in the circuit diagrams of Figs. 5, 6, and 7. For clarity, each diagram shows only one portion of the overall system. Connections extend between the diagrams of Figs. 5 and 6 as indicated at A to E, inclusive. These are described in detail hereafter. Connections also extend between the diagrams of Figs. 6 and 7 as indicated at AA on each figure, and between the diagrams of Figs. 5 and 7 as indicated at AAA in each figure.

*The Field Circuit*

The electrical system can best be described by first considering the field current supply circuit to the generator 26. One terminal (not shown) of the generator field is grounded. The other terminal is indicated at 26F, Fig. 7. The latter terminal is connected through the field current boost rectifier 100, Fig. 7, to the conductor 104 and thence to the main contactor elements 102a of the contactor 102. The circuit can be further traced from elements 102a to conductor 106 and to the positive terminal of the battery 108. Since the negative terminal of the battery is grounded, as is the opposite side of the generator field, this completes the field current energizing circuit. It will be noted that the field current—which is determined by the total voltage applied to the field winding—is in part due to the voltage of battery 108 and is in part due to the voltage developed by rectifier 100. This rectifier coacts with capacitor elements to provide a very rapid field current and flux decay as described hereafter.

Contactor 102 constitutes the field current flow control switch. It is physically closed when the pickup winding 102b and hold-in winding 102c are simultaneously energized.

The energizing circuit to the contactor windings 102b and 102c may be traced from the ground connection through these windings respectively to the conductor 110. This conductor extends to the field control contactor elements 110a and in turn to the main control switch elements 114a, shown for illustrative purposes as one pole of a multiple switch (which may, for example, be a key-operated switch). In brief, when the switch element 114a is closed by the operator, current is free to flow through the contactor elements 110a (if closed) and conductor 110 to the windings 102b and 102c to pick up the contactor 102 and thereby energize the alternator field.

Contactor 112 serves as a control relay for the main field contactor 102. When the winding 112a of the contactor 112 is energized, the contacts 110a are closed to provide field current supply as described above. When the winding 112a is to be de-energized, the circuit to the contactor 102 is opened at 110a and the field winding receives no current. The energizing circuit to the winding 112a of relay or contactor 112 may be traced to the conductor 116, which extends through to Fig. 5 and terminates at terminal 116a. The latter is energized in accordance with the positions of the controls 32L and 32R, as is hereinafter described in detail. In brief, the terminal 116a receives sufficient energizing voltage to pick up and hold in relay 112 when each control handle is on any one of the running positions, or the neutral position. However, when either control handle is in an intermediate position—as during the motion from one position to another—the required voltage at terminal 116a is lost, the contactor or relay 112 drops out because of lack of sufficient current to hold it in, the field is deenergized as described in detail hereafter, and the electrical drive connection is disengaged.

The field current supply mechanism is indicated generally at 400, Fig. 7. It is arranged generally in accordance with the disclosure of Chandler et al. Patent 2,844,783, entitled Field Current Supply System for an Alternator, assigned to the same assignee as the present invention.

As described in further detail hereafter, this field current supply system serves the dual purpose of providing a substantially constant steady state volts-per-cycle alternator voltage and a rapid but smooth field current buildup on closure of the field circuit switch contact 102a.

In brief, the field current supply system includes a three-phase field current boost rectifier indicated generally at 100. This rectifier is in series relation to the generator field (via terminal 26F) and through the conductor 104, the contactor elements 102a, and the conductor 106 is connected to the battery 108. The amount of the field current boost associated with the rectifier 100 is determined by the alternator voltage applied to this rectifier from the three-phase transformers 402a, 402b, and 402c. Each of these has a primary winding 412 in series with one of the line conductors 318c, 318d, and 318e of the alternator 26. Each of these also has a winding 414 connected to the neutral conductor 416 through the windings 418 and 420. The voltages induced in the secondaries 422 are determined by the combined effects of line current flow through the windings 412 and the generator voltage as measured by the windings 414.

The windings 412 and 414 are so designed that the rectifier 100 immediately boosts the field current flow upon the first increment of current flow through the windings 412. In the absence of alternator armature current, the no-load alternator voltage results in current flow through windings 414 and a voltage induced in the winding 422 that is sufficient to compensate for the voltage drop in rectifier 100 associated with the no-load field current passing through the D.C. side thereof. This action is described in detail in the aforementioned Chandler et al. Patent 2,844,783. As there pointed out, it serves to maintain substantially constant alternator volts-per-cycle under all load conditions, including the first increment of load current from the no-load condition.

In the present apparatus the windings 412 and 414 serve an additional purpose. As hereinafter described in detail, the apparatus of the present invention serves to interrupt the field current flow and then to re-establish the field circuit. After the latter action, the field current flow builds up from zero value to the steady state value for the particular operating condition involved. Since this buildup is the result of self-excitation, the rate of current rise under some conditions can be low. Additionally, it is desirable for the field current buildup to reflect the full conditions of alternator operation. Since the windings 412 respond to alternator current flow and the windings 414 respond to alternator voltage, they provide this desirable action. If the field is reconnected at a time when the alternator current flow is low, the windings 412 exert a relatively small influence. On the other hand, if at the moment of field reconnection the impedance of the connected motors is very low, these windings are highly effective and the actions of the windings 414 is correspondingly less significant.

*The Control Handle Operation*

The electrical action of the control handles 32LH and 32RH, FIG. 2 will now be described with reference to the circuit diagram of FIG. 5. In this diagram the electrical control elements actuated by the handle 32LH are indicated by the bracketed arc-shaped series of switch elements in box 200L and the control elements actuated by the handle 32RH are indicated by arc-shaped series of switch elements in box 200R.

The switch elements controlling the left hand motor unit are shown as 200L, FIG. 5. These consist of the neutral switch unit 202L, first to fourth forward speed switch units 204L, 206L, 208L and 210L, and first and second backward speed switch units 212L and 214L. Each of these switch units consists of a movable contact type switch similar to that shown in LeTourneau Patent 2,629,791, entitled Snap Switch, issued on February 24, 1953. In brief, each unit includes a spring biased detent or actuating member which serves to actuate the switch and a contact member which is flexed over the center to an actuated position when the detent is depressed and otherwise remains in a non-actuated position. The contact member serves as a conducting bridge so that the switch operates to connect either of two pairs of contacts and, upon actuation, shifts from connecting one pair to connecting the other pair.

FIG. 8 shows the mechanical construction of the sector or control unit 32L in fragmentary form. As shown, it consists of an arcuate housing indicated specifically at 32L in which are mounted the five spaced switches 202L, 204L, 206L, 212L, and 214L. These switches have the protruding detents or actuating elements 202La, 204La, 206La, 212La and 214La, each of which protrudes radially out in relation to the axis 216. The handle 32LH is located on the end of the arm 218 which is pivotally supported for rotation about the axis 216 and also carries the cam shoe 219. This shoe is positioned to ride over the detents 202La, 204La, 206La, 212La and 214La in accordance with the position of the arm 218, and hence the handle 32LH. As the shoe 219 rides over any one detent, the same is pressed radially inward against the spring action of the switch element and snaps the movable conducting element of the switch to connect the radially outward rather than the radially inward set of fixed contact elements.

The detailed construction of each of the switches will be evident from the views of FIGS. 9 and 10 which show, respectively, the switch 204L in enlarged broken away view and a fragmentary view of the movable switch element itself. As shown in FIG. 9, the switch consists of an insulating housing 220 which is supported within the unit 32L by suitable means (not shown) with the actuating detent element 204La protruding outside the unit 32L as shown. The housing 220 supports fixed contact elements 220a, 220b, 220c and 220d, as shown. Within the housing 220 the detent element 204La has opposed notches which receive the spring arms 220h. These constitute the inner member of the lengthy spring switch element defined by the outer arms 220e. The latter are of serpentine shape as shown in FIG. 9 and serve to pull inwardly against the arms 220h, causing the unit to snap in either concave up or concave down position as seen in FIG. 9, (or, as seen in FIG. 5, the concave-in or concave-out positions). The contact elements 220f and 220g are located at the outboard ends of the switch element and have opposed seating faces to be selectively received on the fixed contacts 220a and 220d in accordance with the position of the switch element.

When the detent 204La is released, the spring 220f forces the same upwardly and causes the switch to assume the position shown in FIG. 9. In this position the contacts 220c and 220d are connected in circuit-making relation through the medium of the portions 220e of the switch as shown. When the shoe 219, FIG. 8, bears on the detent 204La, the detent 204La is depressed against the bias of the spring 220f, the inboard ends of arms 220h are then pushed down, and the elements 220e snap over center to the concave-up (or out) position. The elements 220e now connect the fixed contacts 220a and 220b and leave the fixed contacts 220c and 220d unconnected.

The fixed contacts 220a, 220b, 220c and 220d specifically described above for the switch as shown in FIG. 9 are, respectively, the contacts a, b, c and d of each of the switches 202L, 204L, 206L, 208L, 210L, 212L and 214L, FIG. 5. In FIG. 5 these are shown diagrammatically, it being understood that they are physically as shown in FIG. 9.

As shown in FIG. 5, the "a" and "b" fixed contacts of switch 202L are connected when the control arm (and hence shoe 219, FIG. 8) rides over the detent 202La. This serves to connect fixed contact "a" to the positive D.-C. voltage supply. The connecting circuit can be traced through the switch to fixed contact b of switch 202L to the conductor 221 which may be traced to the main switch 114b, conductor 222, and thence to FIG. 7 and battery 108. With the control arm thus positioned, the terminal 116a is connected through switch 202L to the D.-C. voltage source. It will be noted however, that this connection is through the rectifier 224. This supplies a predetermined current—fixed by the circuit resistance including the rectifier and an auxiliary resistance (not shown) in series therewith, if necessary. This current alone, however, is not sufficient to pick up or to hold in the relay 112. However, if—through the positioning of control handle 32RH—the rectifier 226 is similarly supplied with voltage (through switch 202R, for example) the current flow through the winding 112a is sufficient to pick up the relay 112, the contacts 110a are closed, and field current is supplied to the generator. The current supplied through switch 202R is determined by the circuit resistance including that of rectifier 226 and an auxiliary resistance (not shown), if necessary.

If the handle 32LH is now moved in the clockwise direction of FIG. 8, for example, the shoe 219 passes outside of the region of the detent 202La. This permits the detent 202La to shift radially outwardly under the action of the biasing spring. The switch elements shifts to the concave-in condition connecting fixed contacts 220c and 220d and disconnecting contacts 220a and 220b. The connection of the rectifier 224 to the positive voltage conductor 221 is now broken. In consequence the only current flow through the winding 112a, FIG. 7, is that associated with the action of rectifier 226. This is insufficient to maintain relay 112 energized, with the result that the relay 112 drops out, the contactor 102 drops out, and the field current flow quickly falls to substantially zero as hereinafter described.

However, as soon as the clockwise movement of the handle 32LH brings the shoe 219 over the detent 212La, the latter is depressed. This snaps the movable contact of switch 212 from the concave-in to the concave-out configuration. Contacts a and b of that switch are now connected and contacts c and d are disconnected. As the movable contact of that switch is itself connected to the positive voltage conductor 221 (as shown diagrammatically in FIG. 5), a connection from that conductor to the rectifier 224 may be traced from the fixed terminal a of switch 212L to the fixed terminal d of switch 202L and through the movable element of switch 202L to the fixed terminal c thereof. The latter is connected to fixed terminal a of the switch 202L and thence to the rectifier 224. The winding 112a, FIG. 7, now receives current from both rectifiers 224 and 226 and the relay 112 picks up.

If the control handle 32LH is moved further clockwise it will be noted that the shoe 219 initially swings free of the detent 212La, leaving the detent free to shift out under the bias of the spring element. This causes the movable switch element of switch 212L to assume the concave-inward position, disconnecting fixed terminals a and b and breaking the connection from the rectifier 224 to the positive voltage conductor 221. The relay 112, FIG. 7, once again drops out. However, as the control handle 32LH is moved still further clockwise it depresses the detent 214La, shifts the movable element of the switch 214L to the concave-out position, and makes a circuit between the fixed terminal a of that switch and the positive voltage conductor 221. This circuit is made through the permanent connection of the movable terminal of the switch 214L and the conductor 221, in the manner described with reference to switch 212L. Relay 112 is now energized and contactor 102 picks up to establish the field energizing circuit.

It will be noted from FIG. 5 that rotation of the arm 32LH in the counterclockwise direction will successively shift the movable contacts of each of the switches 204L, 206L, 208L and 210L from the concave-in to the concave-out position. As the shoe 219 thus actuates each of these switches, the a terminal thereof is connected to the positive conductor 221, supplying voltage to the rectifier 224. At each intermediate position the rectifier 224 is disconnected from the positive conductor 221, thereby deenergizing the rectifier 224.

The operation of the right hand control handle 32RH is like that above described in connection with the left hand control handle 32LH. That is, when this handle is so positioned that its shoe element depresses one of the operating switches, voltage is supplied to the rectifier 226 and when the handle is in intermediate position the rectifier is not connected to the voltage source. Thus any movement of the arm 32RH from one position to another—like the movement of the arm 32LH from one position to another—momentarily opens the contactor 102, FIG. 7. The action of this momentary opening of the contactor 102 is described in further detail hereafter.

*The Speed Selecting Action*

It will be noted that there are shown eight contactor units 302, 304, 306, 308, 310, 312, 314 and 316 in FIG. 6. Each of these includes a pair of actuating windings 302a, 304a, 306a, 308a, 310a, 312a, 314a, and 316a, as shown. Windings 302a, 308a, 310a, 312a, 314a, and 316a are connected to the respective energizing conductors 302b, 308b, 310b, 312b, 314b and 316b, which are indicated on both FIG. 6 and FIG. 5. It will be noted that these are each connected to the "b" fixed contacts of the respective switches 208L, 210L 206L, 214L, 204L and 212L. These contacts correspond to the contact 220b of switch 220, described above in detail with respect to FIG. 9. Since the moving contact elements of each of these respective switches are connected to the positive conductor 221, actuation of the detent of any one of these switches—through the action of the shoe 219, FIG. 8— and the incident change of the movable contact thereof from the concave in to the concave out position serves to apply voltage from conductor 221 to the corresponding conductor 302b, 308b, 310b, 312b, 314b, and 316b.

Application of voltage to any one of the above-mentioned conductors serves to energize the corresponding contactor. That is, for example, if the control handle 32LH is swung to position over the switch 212L, FIG. 8, and thereby depresses the detent 212La thereof, the movable contact is shifted from the concave-in to the concave-out position, voltage is applied from conductor 221 to the conductor 316b, and the relay actuating coils 316a are energized. This causes the contactor 316 to pick up, closing the three contact elements 316c. Similar action takes place with respect to the contactors 302, 308, 310, 312, and 314, when the corresponding conductor 302b, 308b, 310b, 312b, or 314b is energized through the appropriate positioning of the control handle 32LH.

The action of the contacts above described will now be discussed in terms of the respective operating speeds of the unit. First, when the control knob 32LH is in the neutral position shown in FIG. 8, only the switch 202L is in the concave-out position and none of these contactors is energized. In this condition, the rectifier 224 receives voltage is described above, thus contributing half of the current flow required to close the field current relay (and thereby the first circuit contactor). The left hand motor unit including motors 54L and 56L is not now energized because the armature windings thereof are not connected to the generator. When the control knob 32LH is now shifted in the clockwise direction of FIG. 8 to the position over switch 212L, the motors 54L and 56L are connected in the first reverse position. At this time the conductor 316b receives voltage and the contactor 316 picks up. This is due to the initial energization of windings 316a, followed by opening of the hold in switch contacts 316e, leaving only one coil energized. The energized coil has sufficient turns to maintain the contactor in the closed position once it is closed. The contacts 316c are now closed. Each of these is connected to one of conductors 318c, 318d, and 318e, FIGS. 6 and 7. These are in turn connected to the alternator three-phase output terminals 320c, 320d and 320e, as shown.

Energization of the contactor 316 accordingly applies the alternator output voltage to the three conductors 322a, 322b, and 322c, FIGS. 5 and 6, which connect to the terminal 324 of motor 54L. It will be noted from FIG. 3 that this motor drives the inner shaft 40, and hence the sun gear 42. Since the winding connected to terminals 324 is the low speed winding and defines, for example, 12 poles, the speed of rotation of the shaft 40 is relatively low in relation to the alternator frequency. With the alternator operating at, say, 100 cycles, the shaft 40 might, for example, rotate at 1000 r.p.m. Operating through the reduction effect of the planetary gear mechanism, this speed is, in effect, 333 r.p.m. and the vehicle moves at the appropriate low speed.

It will be noted that with the control handle 32LH positioned to actuate switch 212L, the brake winding 50L is energized and, hence, is disengaged. This energizing circuit can be traced from winding 50L to the conductor 325 to the a terminal of switch 212L and thence, through the movable contact of this switch, to the positive voltage conductor 221.

The connections between the conductors 318d and 318e through contactor elements 316c to the conductors 322b and 322c are reversed. This reverses the phase sequence at terminals 324. This causes the motor 54L to rotate in reverse direction. The left hand motor unit accordingly rotates at low reverse speed when the control knob 32LH is in position to actuate switch 212L.

When the control knob 32LH is shifted an additional step clockwise as seen in FIG. 8, the switch 214L is actuated. This energizes the conductor 312b by reason of the connection of that conductor to the fixed contact b of the switch 214L. In turn, this causes the contactor 312 to pick up in the same fashion as is above described with reference to contactor 316. Pickup of contactor 312 closes the three contacts thereof to connect the high speed conductors 326a, 326b and 326c to the conductors 318c, 318e and 318d carrying the generator armature voltage. The conductors 326a, 326b and 326c connect, as shown in FIG. 5, to the high speed winding terminals 328 of the motor 54L. It will be noted that at this time the conductors 318d and 318e are connected in reversed phase relation to the conductors 326b and 326c, thereby causing the motor 54L to turn in reverse direction. The brake 50L is released in this condition of operation since the terminal "a" of the switch 214L is connected to the conductor 221 as well as to the conductor 325 which applies energy to the brake solenoid.

Contactor 312 has a set of auxiliary contacts 312c that close when the contactor is energized. One size is connected to the conductor 338 as shown in FIG. 6. This conductor connects through to FIG. 5, as shown, and is there connected to conductor 221 to receive the D.-C. voltage as described above. The other side is connected to conductor 340, FIG. 6. When contacts 312c are closed, the conductor 340 is thus energized, and hence the winding 306a of the contactor 306 is energized. This closes contactor 306 and short circuits the conductors 322a, 322b, and 322c, which are connected to the low speed armature terminals 324 of motor 54L. Since contactor 312 closes when the high speed winding of motor 54L is energized, the effect of the contactor 306 is to short circuit the low speed terminals 324 whenever the high speed terminals are energized, which is the proper connection of the motor for high speed operation.

When the knob 32LH is shifted counterclockwise as seen in FIG. 8 to actuate the switch 204L, voltage is applied to conductor 314b and thence to the operating coil 314a of contactor 314. As will be evident from the circuit connections of this contactor, closure of the same connects the three-phase conductors 318c, 318d and 318e to the conductors 322a, 322b and 322c, respectively. The terminals 324, FIG. 5, are accordingly energized in the same fashion as above described with reference to contactor 316, except that the phase sequence is maintained. The motor 54L is accordingly energized in low speed forward rotation and, through the planetary gear mechanism, the output shaft 48, FIG. 3, is driven at the lowest forward speed.

If the knob 32LH is shifted an additional step counterclockwise as seen in FIG. 8, the switch 206L is actuated, voltage is applied from conductor 221 to conductor 310b, the contactor 310 picks up, and the conductors 326a, 326b, and 326c are energized in the same sequence as the conductors 318c, 318d, and 318e. This energizes the high speed winding of motor 54L in the forward direction.

Contactor 310 has a set of auxiliary contacts 310c that close when the contactor is energized. One side is connected to the conductor 338 as shown in FIG. 6. This conductor connects through to FIG. 5, as shown, and is there connected to conductor 221 to receive the D.-C. voltage as described above. The other side is connected to conductor 340, FIG. 6. When contacts 310c are closed, the conductor 340 is thus energized, and hence the winding 306a of the contactor 306 is energized. This closes contactor 306 and short circuits the conductors 322a, 322b, and 322c, which are connected to the low speed armature terminals 324 of motor 54L. Since the contactor 310 closes when the high speed winding of motor 54L is energized, the effect of the contactor 306 is to short circuit the low speed terminals 324 whenever the high speed terminals are energized, which is the proper connection of the motor for high speed operation.

When switch 204L or 206L is actuated, the brake 50L is energized—and hence released by reason of the connection of the conductor 325 to the fixed contacts "a" of each of these switches.

If the knob 32LH is shifted counterclockwise an additional step to actuate the switch 208L, the conductor 302b is energized and the contactor 302 picks up. This connects the three phase conductors 318c, 318d and 318e in the same phase sequence to conductors 330a, 330b and 330c. As will be evident from FIG. 5, the latter conductors are connected to the terminals 332 of the low speed winding of motor 56L, thereby energizing that winding. In addition, the brake 52L is energized, and hence released, by the energizing connection that can be traced through the rectifier 334 and conductor 336 to that brake. The rectifier 334 serves to prevent energization of brake 52L when the brake 50L is energized.

It will also be noted that actuation of the switch 208L also supplies D.-C. power from conductor 221 to the fixed contact b of the switch 206L. This connection is made through the conductor 339. The conductor 310b is accordingly energized, the contactor 310 is picked up, and the high speed drive terminals 328 of the motor 54L are energized. When contactor 310 is picked up, contactor 306 is energized, and conductors 322a, 322b, and 322c are short circuited, as described above in detail in setting forth the high speed motor connection. The shaft 48 is accordingly driven in the forward direction at the speed corresponding to high speed operation of the motor 54L and low speed operation of the motor 56L.

When the knob 32LM is shifted an additional step in the counterclockwise direction of FIG. 8, the switch 210L (FIG. 5) is actuated to position the movable element thereof in the outwardly concave direction. This energizes the conductor 308b and picks up the contactor 308, FIG. 6. The conductors 334a, 334b and 334c are thereby connected, respectively, to the conductors 318c, 318d and 318e, which thus receive the generator armature voltage. Conductors 334a, 334b and 334c are connected to the high speed winding terminals 336, FIG. 5, of motor 56L. This winding is accordingly energized and the motor 56L rotated at high speed in the forward direction.

The contactor 304 serves to connect (short circuit) the terminals 332 when the high speed winding terminals 336 are energized. This results from the auxiliary contacts 308c of the contactor 308, which close in response to energization of the contactor 308. When contacts 308c close, the windings 304a of the contactor 304 are energized through the connection that can be traced from windings 304a to conductor 336 and thence to contacts 308c. The circuit can further be traced to conductor 338 and to FIG. 5, where the same connects to conductor 221 and hence to the positive D.-C. voltage supply. Energization and pickup of contactor 304 short circuits the conductors 330a, 330b and 330c, and hence the terminals 332 of the low speed winding of motor 56L. This serves to provide the proper connection for operation of the high speed winding.

The rectifiers 339' and 341 serve to prevent the back feed of direct current from the terminal b of the switch 206L to the terminals b of switches 208L and 210L. These rectifiers do not, however, interfere with the forward feed of current from the b terminals of switches 208L and 210L to the b terminal of switch 206L.

The right hand motor unit 28R is connected and energized in the same fashion as the left hand motor unit 28L, above described in detail. Movement of the operating knob 32RH accordingly connects and energizes the right hand motor unit to provide the same speeds of operation as are provided for the left hand motor by similar positioning of the operating knob 32LH.

In an actual tractor unit constructed in accordance with the present invention, the respective speeds of typical operation were as follows:

| Control Knob Position | Prime Mover Speed, r.p.m. | Motor 54L, r.p.m. | Motor 56L | Drive Speed (Synchronous) |
|---|---|---|---|---|
| 1 | 1,000 | 1,000 | Brake | 333 |
| 2 | 1,000 | 2,000 | Brake | 667 |
| 3 | 1,000 | 2,000 | 1,000 r.p.m. | 1,333 |
| 4 | 1,000 | 2,000 | 2,000 r.p.m. | 2,000 |

It will be noted, as discussed above, that the synchronous drive speed is one-third that of motor 54L plus two-thirds that of motor 56L. In at least the fourth control knob position the operator can increase the drive speed to about 4000 r.p.m. by accelerating the prime mover to 2000 r.p.m. This value is within the normal range of engine operation, and when used gives net speed ratio of the highest to the lowest synchronous speed of 12 to 1.

When the control knob is in the third position, the motor 56L tries to drive the motor 54L, the latter acting as an induction generator. Since the motor 56L is made of sufficient capacity to provide at least this much spare power for other reasons, this action gives rise to no serious problems.

The motors of the units 28R and 28L are of the squirrel cage induction type, thereby providing a high degree of reliability, small size, and the other advantages of this type motor. The motors differ, however, from induction motors usually used for driving vehicles in that they are not of the high resistance rotor type. Rather, they use the double squirrel cage construction in which two low resistance windings are formed by conducting bars cast into the rotor, and in which a rather flat speed-torque curve is provided. Motors of this type—unlike the high resistance or hoist type motors—are characterized by high operating efficiency. These rather flat torque-speed characteristics, however, have heretofore prevented substantial use of such motors in applications such as vehicles, hoists, and the like where it is necessary to provide relatively low speed high torque drive and at the same time effect high speed low torque drive. In the apparatus of the present invention the prime mover provides some measure of drooping torque-speed curve, the generator and field current supply system provides some additional droop, the motors contribute some droop, and the operator through the throttle control (or governor setting control) provides additional droop effect. The net result is to provide a sufficient degree of self-unloading effect in the system as a whole to provide effective operation notwithstanding the flat motor characteristics at constant applied voltage and frequency.

*The Electrical Shifting Operation*

The above discussion of the electrical system describes the steady state operation of the unit. An important aspect of the present invention resides in the mechanism by which the electrical system is shifted or transferred from one driving condition to another. This action is achieved through the coaction of the various parts of the switching mechanism, above described, with the alternator excitation system.

When either of the operating knobs 32LH and 32RH is placed in an operating position (or in the neutral position), the respective rectifier 224 or 226 receives operating voltage from the conductor 221, FIG. 5. This circuit may be traced from the a contact of the particular switch that is actuated by the operating arm shoe 219, FIG. 8. At any intermediate position—with the shoe 219 riding off a switch actuating detent and not yet received on the next switch actuating detent—the switches are all released and assume the concave-down positions as seen in FIG. 5. At this time there is no connection between the conductor 221 and any of the "a" terminals of the respective switches, and accordingly no energizing circuit to the corresponding rectifier 224 or 226.

Two distinctly different types of action occur in the sequence of moving from one switch position to the next. First, the switch engaged by the shoe 219, FIG. 8, is released (thereby causing contactor 102 to open). The field circuit is thus broken and the alternator field current accordingly seeks a steady state zero current condition. The field current and flux actually drops to zero very rapidly due to the action of the capacitors 103 which are connected across the contacts 102a of the contactor 102. These may, for example, aggregate about 86 microfarads with a generator having a normal full load field current of about 50 amperes and normal full load field voltage of about 50 volts. It is believed that due to the charging of these capacitors, the current and flux in the field fall essentially to zero in less than one hundredth of a second.

The electrical system defined by the field winding of the generator 26 and the relatively large capacitors 103 is oscillatory in character. However, the current falls to zero and does not substantially oscillate because of the action of the rectifier 100. It will be noted in this connection that the rectifier serves to conduct the current flow in the forward direction of the field but opposes current flow in the reverse direction. Because of this action the capacitors may be selected of large size, providing a very rapid fall in field current and flux without at the same time creating field current oscillations. In addition, it is unnecessary to provide a resistance or other energy dissipating means.

When either control is moved to the point where another switch is actuated (and the other control is actuating a switch), the relay 112 picks up by reason of the application of voltage to the conductor 116. This action is very rapid, as is the subsequent pickup of the field circuit contactor 102. The field circuit is now complete. The field current now builds up under the applied field voltage. This voltage is due in part to the voltage of battery 108, in part to the armature current flow acting through windings 412 and the rectifier 100, and in part to the armature voltage acting through windings 414 and rectifier 100. The relative contributions of these respective voltage sources to the field voltage (and hence rate of field current increase) varies with the operating conditions. If the motors present a low impedance load, for example, the relative contribution of the voltage-sensitive windings 414 is small and the relative contribution of the current responsive windings 412 is great. When—due to existing motor rotations or otherwise—the motor impedance is high (or there is a counter voltage in the motor) the relative contribution of the voltage sensitive windings 414 is great and that of the current responsive windings is small.

The field current buildup above described serves to bring the electrical system into driving engagement in a progressive fashion. That is, instead of the jolt and shock that would be incident to application of field current instantaneously, the field current slowly increases and ultimately reaches the steady state value—the driving engagement being progressively greater with time.

The actual field current and flux decay and subsequent recovery with movement of the control knob or knobs from one position to another is highly complex and is above described only in its most simple respect. Since the motors are connected to the generator 26 while they may be running—and since there may be a residual magnetic field in both motor and generator at the moment of reconnection—there is some tendency for initial effects to influence the operation of the system at this time. However complicated these and other effects may be, the overall result is to provide a system that may be shifted from one control setting to another without jolts, shock, or other undesirable effects.

FIGURE 11 shows in approximate form the sequence of events when either of the control knobs is moved from one position to another. Initially the field current is, for example, 50 amperes. When the shift is made the current falls to zero in, for example, about 0.01 second. The current remains off for a period of perhaps 0.2 second while the operator is moving the control knob to the next position and, in addition, the contactors are reclosing to establish the new circuit connections. Then at the time indicated as "reconnect," the field and armature circuits are re-established and the current slowly rises to the new steady state value. The rate of rise may, for example, be such as to bring the field current back to about the original value in 0.5 second.

The apparatus of the present invention has been embodied in a tractor mechanism of the type generally shown in FIG. 1. For this reason the above description is in terms of this device. It will be apparent, however, that the circuitry and construction may be embodied in other electric drive mechanism, such as, for example, a hoist drive. In such instance, one of the motor units, such as that of FIG. 3, would be employed to drive the load through the planetary gearing mechanism and through the use of the same circuitry as one side of the control mechanism described above.

While I have shown and described a specific embodiment of the present invention it will, of course, be understood that various modifications and alternative constructions can be made without departing from the spirit and scope thereof. I therefore intend by the appended claims to cover all such modifications and alternative constructions as fall within their true spirit and scope.

What I claim as new and desire to secure by Letters Patent of the United States is:

1. A multispeed electric motor mechanism comprising in combination: a pair of electric motors each having a rotor and an output shaft, the output shafts being telescopically related and substantially coterminous at one end to define inner and outer independently driven shaft members having a common axis; a ring gear affixed to the outer shaft member; a sun gear affixed to the inner shaft member in alignment with the ring gear to define an annular gear space; planet gears; an output member, the output member being mounted for rotation about said common axis, said planet gears being mounted on the output member for rotation about axes parallel to and spaced from said common axis, said planet gears bridging said annular space and meshing with the sun gear and ring gear; means selectively operable to energize the motors in predetermined torque-speed characteristics; and brake means selectively operable to brake the motors, whereby selective energization and braking of the motors provides a variety of output member torque-speed characteristics.

2. A multispeed electric vehicle drive mechanism for a vehicle having a frame and a pair of substantially coaxial wheels straddling the same, comprising in combination: a pair of drive units on the frame substantially between said wheels, each drive unit including at least a pair of motors with telescopically related coterminous output shafts defining inner and outer independently driven shaft members having a common axis, sun and ring gears affixed to said shaft members at the common end thereof to define an annular space, planet gears, an output member, the output member being mounted for rotation about said common axis, said planet gears being mounted on the output member for rotation about axes parallel to and spaced from said common axis, said planet gears bridging said annular space and meshing with the sun gear and ring gear; drive elements connecting said output members respectively, to the wheels; brake elements selectively effective on said individual motors, respectively; and means selectively operable to apply driving energy to said motors and braking energy to said brakes.

3. A multispeed electric motor mechanism comprising in combination: a pair of electric motors each having a rotor and an output shaft, the output shafts being substantially coterminous at one end and having a common axis; a ring gear affixed to one of the output shafts; a sun gear affixed to the other output shaft in alignment with the ring gear to define an annular gear space; at least one planet gear; an output member, the output member being mounted for rotation about said common axis, said planet gear being mounted on the output member for rotation about an axis parallel to and spaced from said common axis, said planet gear bridging said annular space and meshing with the sun gear and ring gear; means selectively operable to energize the motors in predetermined torque-speed characteristics; and brake means selectively operable to brake the motor, whereby selective energization and braking of the motors provides a variety of output member torque-speed characteristics.

4. A multispeed electric vehicle drive mechanism for a vehicle having a frame and a pair of substantially coaxial wheels straddling the same, comprising in combination: a pair of drive units on the frame substantially between said wheels, each drive unit including at least a pair of motors with coterminous output shafts on a common axis, sun and ring gears affixed to the output shafts at the common end thereof to define an annular space, at least one planet gear, an output member, the output member being mounted for rotation about said common axis, said planet gear being mounted on the output member for rotation about an axis parallel to and spaced from said common axis, said planet gear bridging said annular space and meshing with the sun gear and ring gear; drive elements connecting the output members, respectively, to the wheels; brake elements selectively effective on the individual motors, respectively; and means selectively operable to apply driving energy to the motors and braking energy to the brakes.

5. A system for driving a load at any one of at least two speeds in relation to the speed of a prime mover, comprising in combination: a source of electric power driven by the prime mover; a pair of electric motors each having a rotor and an output shaft, the output shafts being substantially coterminous at one end and on a common axis; a ring gear affixed to one shaft member; a sun gear affixed to the other shaft member; at least one planet gear in mesh with the ring gear and the sun gear; an output member, the output member being mounted for rotation about said common axis, said planet gear being mounted on the output member for rotation about an axis parallel to and spaced from said common axis, said planet gear bridging said annular space and meshing with the sun gear and ring gear; means selectively operable to energize the motors from the power source in predetermined torque-speed characteristics; and brake means selectively operable to brake the motors, whereby selective energization and braking of the motors provides a variety of output member torque-speed characteristics.

6. A multispeed electric vehicle drive mechanism for a vehicle having a frame and a pair of substantially coaxial wheels straddling the same, comprising in combination: a prime mover; a source of electric power driven by the prime mover; a pair of drive units on the frame substantially between said wheels, each drive unit including at least a pair of motors each having a pair of output shafts on a common axis, sun and ring gears affixed to the output shafts, at least one planet gear in mesh with the sun and ring gears, and an output member, the output member being mounted for rotation about said common axis, said planet gear being mounted on the output member for rotation about an axis parallel to and spaced from said common axis, said planet gear bridging said annular space and meshing with the sun gear and ring gear; drive elements connecting the output members, respectively, to the wheels; brake elements selectively effective on the individual motors, respectively; and means selectively operable to apply driving energy from the electric power source to the motors and braking energy to the brakes.

7. A system for driving a vehicle having at least two laterally spaced wheels at any one of at least two speeds in relation to the speed of a prime mover, comprising in combination: an alternator on the vehicle and driven by the prime mover; a pair of drive units on the vehicle, each drive unit including at least a pair of electric motors having a pair of output shafts on a common axis, a sun gear affixed to the output shaft of one motor of said pair and a ring gear affixed to the output shaft of the other motor of said pair, a planet gear in mesh with the sun and ring gears, an output member, the output member being mounted for rotation about said common axis, said planet gear being mounted on the output member for rotation about an axis parallel to and spaced from said common axis, said planet gear bridging said annular space and meshing with the sun gear and ring gear; drive elements connecting the output members, respectively, to the wheels; brake elements selectively effective on the individual motors, respectively; and means selectively operable to apply driving energy from the alternator to the motors and braking energy to the brakes.

References Cited in the file of this patent

UNITED STATES PATENTS

| | | |
|---|---|---|
| 1,076,614 | Thomas | Oct. 21, 1913 |
| 2,047,050 | Armington | July 7, 1936 |
| 2,209,641 | Weber | July 30, 1940 |
| 2,436,936 | Page | Mar. 2, 1948 |
| 2,573,071 | Storsand | Oct. 30, 1951 |
| 2,578,015 | Reinhard | Dec. 11, 1951 |
| 2,586,273 | Steven | Feb. 19, 1952 |
| 2,864,265 | Fell | Dec. 16, 1958 |
| 2,887,641 | Scharstein et al. | May 19, 1959 |
| 2,896,143 | Bekey | July 21, 1959 |
| 2,951,397 | Schroeder | Sept. 6, 1960 |